United States Patent [19]

Irwin

[11] 4,158,570

[45] Jun. 19, 1979

[54] PREPARING MAGNESIUM OXYCHLORIDE AND/OR OXYSULFATE CEMENTS

[75] Inventor: Robert G. Irwin, Glenshaw, Pa.

[73] Assignee: PPG Industries, Inc., Pittsburgh, Pa.

[21] Appl. No.: 937,297

[22] Filed: Aug. 28, 1978

[51] Int. Cl.$^2$ .......................... C04B 9/02; C04B 9/04
[52] U.S. Cl. ..................................... 106/106; 106/105
[58] Field of Search ................. 106/105, 106; 423/472

[56] References Cited

U.S. PATENT DOCUMENTS

| | | | |
|---|---|---|---|
| 2,703,762 | 3/1955 | Slayter | 106/105 |
| 2,939,799 | 6/1960 | Chisholm | 106/108 |
| 3,320,077 | 5/1967 | Prior | 106/105 |

Primary Examiner—O. R. Vertiz
Assistant Examiner—Mark Bell
Attorney, Agent, or Firm—John E. Curley

[57] ABSTRACT

A method of preparing magnesium oxychloride and/or oxysulfate cements is described which involves the control of temperature of the magnesium chloride and/or sulfate solutions and the magnesium oxide used to prepare the cements during mixing and the controlled addition of the requisite amounts of magnesium oxide, magnesium chloride and/or sulfate required to form the cements during the mixing procedure. In mixing the requisite oxides with the sulfate and/or chloride solutions used to produce the cement mixtures, the oxide is mixed and thoroughly blended with at least 80 percent of the requisite chloride and/or sulfate solution required to provide a homogeneous mixture. After achieving the initial homogeneous mixture, the balance of the chloride and/or sulfate solution required to provide the requisite chemical constituents to form an oxychloride or oxysulfate cement is added and thoroughly blended to provide a second homogeneous mixture capable of forming a magnesium oxychloride or magnesium oxysulfate cement product upon setting.

6 Claims, No Drawings

PREPARING MAGNESIUM OXYCHLORIDE AND/OR OXYSULFATE CEMENTS

BACKGROUND OF THE INVENTION

Inorganic plastic cement such as magnesium oxychloride and magnesium oxysulfate cements have been described in numerous patents. Cements of this type are highly desirable if they can be uniformly produced and molded since parts made from such materials possess excellent fire retardant properties. When reinforced with glass fibers to provide suitable strength, molded oxychloride or oxysulfate cements may be used to produce articles such as boat parts, building panels and the like for use in high fire risk areas. The mixing of the materials that form the oxychloride and oxysulfate compositions often involve the use of prolonged mixing cycles or high shear blending techniques. These procedures are described in U.S. Pat. Nos. 3,320,077 and 2,939,799.

During the mixing of the ingredients magnesium oxide with the magnesium chloride and/or magnesium sulfate solutions used to prepare the oxycements, excessive temperature conditions occurring in the mixing equipment can result in a premature setting of the oxychloride cement causing the mixing zone to be fouled with a cement that is already set up. Further, it is often necessary to conduct a mixing operation in externally cooled mixing equipment that adds considerably to the cost of the product. Thus, the controlling of the mixing of the inorganic cement ingredients to minimize these problems is desirable provided satisfactory cements can be produced while remedying the aforementioned problem.

THE INVENTION

It has been found in accordance with the present invention that considerable improvement can be realized in the preparation of magnesium oxychloride and magnesium oxysulfate plastic cements by regulation of the mixing of the magnesium oxide with the magnesium chloride or magnesium sulfate solution to minimize any sharp temperature increases in the mixture formed during the mixing cycle. The mixing procedure is thus conducted at low shear or low mixing speeds during the addition of up to 75 percent of the required oxide to the sulfate or chloride solutions. High shear mixing or high speed mixing is conducted in the final phase of the oxide and sulfate or chloride addition. Operating in this manner, energy input into the system is minimized from the mixing equipment and this assists in keeping the temperature of the oxide-chloride or oxide-sulfate mixtures below about 130° F. (54° C.) during the mixing without the need for external cooling. To further assist in preventing premature setting of the mixture during mixing, up to 20 percent of the necessary sulfate or chloride solution used to form the oxychloride and oxysulfate cement is added to the mixing unit or vessel after the entire amount of the oxide has been introduced to the initial quantities of sulfate and chloride solutions employed and thoroughly mixed therewith. Thus, the entire amount of the oxide to be used is mixed with at least 80 percent of the chloride and/or sulfate solutions to be used in the manufacture of cement and a homogeneous mixture is provided. The addition of the final volume of chloride or sulfate solution after the initial mixing has been accomplished reduces or eliminates the necessity for external cooling to maintain the mixture being formed at or below 130° F. (54° C.) thereby preventing any premature setting of the cement.

Magnesium oxysulfate and oxychloride cements are formed by the intimate mixing of concentrated solutions of magnesium sulfate or magnesium chloride with magnesium oxide. Magnesium sulfate solutions may typically contain 50 to 75 percent by weight magnesium sulfate solids. Magnesium chloride solutions used typically contain from 60 percent to 85 percent by weight solids.

In a typical formulation of magnesium oxychloride cement, magnesium chloride ($MgCl_2.6H_2O$) is mixed with water, phosphoric acid ($H_3PO_4$) and sodium hexametaphosphate ($(NaPO_3)_6$). To the resulting mixture is added magnesium oxide in the requisite amount to form a paste-like material which upon setting or molding produces a magnesium oxychloride article ($MgO.MgCl_2.6H_2O$). The $MgO.MgCl_2$ weight ratio in preparing the cement mixtures is in general maintained between 40 and 60 percent. The cements resulting from this formulation are cured by standing at room temperature in a mold of a desired shape or they are cured by using temperatures and pressures such as by molding in a press. Conditions suitable for such a molding operation are described in detail in the aformentioned U.S. Pat. No. 3,320,077.

In preparing magnesium oxysulfate cements in accordance with the instant invention, mole ratios of MgO to $MgSo_4.7H_2O$ of from 3 to 1 to 14 to 1 may be employed. Similarly with respect to magnesium oxychloride cements, the MgO to $MgCl_2.6H_2O$ mole ratio is maintained from about 3 to 1 to about 8 to 1. As with magnesium oxychloride cement, the magnesium sulfate cement ($MgSO_4.7H_2O$) is mixed with sufficient quantities of magnesium oxide to provide a magnesium oxysulfate of formula ($5MgO.MgSO_4.H_2O$) which is a true oxysulfate.

Since it is important that the magnesium oxide-magnesium salt solutions (chloride or sulfates) be blended so as to deagglomerate and defloculate the magnesium oxide particles and to disperse the magnesium oxide in the magnesium salt solutions, it is necessary that high shear blending techniques be used in the mixing process. If not used, the resultant cured cements will not possess the water insoluble oxychloride and oxysulfate systems and thus will have poor properties. The equipment necessary for high shear blending as practiced by this invention is known in the art and mixing equipment such as sonic homogenizers, colloid mills, high pressure impact mills, turbine and propeller mixers and the like may be employed. Detailed descriptions of these mixers are described in CHEMICAL ENGINEERS' HANDBOOK (3rd Edition) 1950 at pages 1202–1214.

The process of the present invention further contemplates the provision of a phosphate in the cement in an amount sufficient to improve the wet strength of the cement, preferably by providing a phosphate dissolved in the concentrated magnesium salt solution. Thus, for instance, the following water soluble phosphates can be used: phosphoric acids, including orthophosphoric, pyrophosphoric acid and monomagnesium phosphate; polyphosphates, including pyrophosphates, tripolyphosphates, tetrapolyphosphates and long chain polyphosphates, particularly sodium polyphosphates, such as sodium hexametaphosphate and sodium tripolyphosphate and various other alkali metal polyphosphates; the various alkali metal mono and dibasic phosphates such as mono basic sodium phosphate and the various ammonium phosphates such as ammonium polyphosphate and the like. The various classes of water soluble phosphate compounds are described in "Phosphorous and Its Compounds," Volume 1, CHEMISTRY by John R. Van Wazer, Interscience Publishers, Inc., New York (1958).

The water soluble phosphate salts cannot be dissolved directly in highly concentrated magnesium salt solutions. They must be first dissolved in water and then the magnesium salt dissolved in the water. The polyphosphates are particularly preferred in this instance since they maintain the magnesium salt in solution where the solution is cooled to less than ambient temperatures, probably by chelation. The strongly acid phosphate salts as well as the acids are also particularly preferred for this purpose. Thus, the solution used in the preparation of the inorganic plastic cement slurries comprises a water solution of (a) a magnesium salt selected from the group consisting of magnesium chloride and magnesium sulfate, the solution containing a concentration of magnesium salts such that water soluble phosphate salts will not dissolve upon addition to the magnesium salt solution and (b) about one to six percent by weight based upon the weight of the magnesium salt hydrate of a water soluble phosphate salt dissolved in the solution are contemplated as reactive magnesium salt solutions in the present invention.

The present invention also contemplates the use of difficulty soluble salts of the phosphates in the inorganic plastic cement slurries of the present invention to improve the wet strength of the cured cement. The use of such salts as well as other materials in magnesium cements has been found by the prior art to improve the properties of the resulting cured inorganic plastic cements. Thus, for instance, phosphates or secondary phosphates of metals such as the alkaline earth metal phosphates which are difficultly soluble, including calcium and magnesium phosphates as well as aluminum and copper phosphates and acid phosphates can be used. Various other difficultly soluble metal phosphates can be used such as those described in U.S. Pat. No. 2,351,641; however, they are not preferred.

The soluble phosphate salts are preferred over the insoluble phosphate salts primarily because of the better wet strengths of the cements produced. This is believed to be because of the interaction of the soluble phosphate salts with the magnesium oxide to form insoluble magnesium phosphate complexes or compounds which improve the wet strength of the resulting cured cement product. Sodium hexametaphosphate is particularly preferred.

Regardless of whether a magnesium oxychloride or a magnesium oxysulfate cement is the desired end product, in accordance with the teachings of the instant invention, it is an important consideration that all of the magnesium oxide be mixed with between 80 to about 90 percent of the magnesium chloride or magnesium sulfate required to produce the oxychloride cement and that the mixing procedure be continued until all the magnesium oxide has been added. At this time the remaining magnesium chloride or magnesium sulfate may be added. The temperature of the chloride oxide mixed during the initial mixing stage is maintained at about 130° F. (54° F.) by regulating the mixing equipment to provide for low shear mixing during the addition of at least 75 percent of the requisite oxide. High shear mixing may be employed for the addition of the remaining oxide and the temperatures of the mixture will not exceed 130° F. (54° C.). Upon completion of the addition of all the required oxide to between 80 to 90 percent of the necessary chloride and/or sulfate solution, the final chloride and/or sulfate addition is then made and the mixing is conducted under high shear blending to form the final product mixture. It is found that by use of a controlled high shear blending, temperatures above 130° F. (54° C.) are readily avoided and no setting of cement mixtures in the mixing equipment will occur. The invention will now be described with reference to the following example.

EXAMPLE 1

A magnesium oxychloride cement was prepared and formed into a panel in the following manner. A 2.8 gram quantity of sodium hexametaphosphate was dissolved in 105.5 grams of water in a Waring blender. The blender was activated and set on low speed and 5.6 grams of phosphoric acid was added to it. After all of the acid was added, 303.9 grams of magnesium chloride ($MgCl_2.6H_2O$) were added and mixed with the blender ingredients until all of the magnesium chloride was dissolved, with the blender still being operated at low speed. While still operating the blender at low speed, magnesium oxide was added thereto until the mixture became viscous enough to impede mixing. At this point about 75 percent of the requisite magnesium oxide had been added. The blender was then switched to high speed and further magnesium oxide was added until 282 grams of the oxide had been introduced and mixed with the blender ingredients and the temperature did not exceed 130° F. (54° C.). The mixing was then continued and an additional 47.5 grams of $MgCl_2.6H_2O$ was added and thoroughly mixed with the blender contents while still providing a temperature in the mixture below 130° F. (54° C.) without external cooling. The resulting mixture was then cooled in the blender immersed in a water bath until the mixture reached a temperature between 72° F. to 75° F. (22.2° C. to 23.9° C.).

The resulting magnesium oxychloride cement mixture was placed in a 12 inch by 12 inch (30.48 centimeter by 30.48 centimeter) mold which had a ¼ ounce fiber glass mat placed therein. The mat weighed 65 grams and 260 grams of magnesium oxychloride cement was added to the mold. The mold was placed in a platen press operating at 205° F. to 230° F. (79.6° C. to 110° C.) for 5 minutes at about 20 to 25 tons pressure on the 12 inch by 12 inch (30.48 centimeter by 30.48 centimeter) mold. A 12 inch by 12 inch (30.48 centimeter by 30.48 centimeter) panel was removed frm the mold and placed in a water tank to a depth of 8 inches (20.32 centimeters) at 210° F. to 212° F. (99° C. to 100° C. ) for 2 minutes. The panel was then removed and was placed in a humidity chest set at 80 percent relative humidity at 120° F. (49° C.) for 70 hours. The panel was removed from the chest and visual examination showed that the 8 inch (20.32 centimeter) section of the panel subjected to the water treatment exhibited no efflorescence while the upper 4 inches (10.16 centimeters) had effloresced considerably.

In similar experiments where high speeds were employed in the initial mixing steps, frequent occurrences of the setting up of the cement in the blender occurred.

In those applications of the instant invention wherein magnesium oxysulfate articles are treated, a magnesium sulfate hydrate ($MgSO_4.7H_2O$) is used as the sulfate component and this is combined with magnesium oxide to provide a cement of magnesium oxysulfate of the composition of 5MgO.MgSO$_4$.8H$_2$O. The magnesium oxysulfate compositions are prepared in the same manner as shown hereinbefore with respect to the magnesium oxychloride cements and the treatments in accordance with the instant invention is used to render the surfaces of the panels free of the efflorescence problem associated with those panels when they are prepared as in Example 1 hereinabove.

As with the preparation of magnesium oxychloride cements, it is advantageous in preparing the oxysulfate species to mix the magnesium oxide and the magnesium sulfate in a manner such that about 80 to 90 percent of the magnesium sulfate is first mixed with all of the oxide of the final mixture and to conduct the final mixing by adding the remaining sulfate to the previously formed mixture of sulfate and oxide while maintaining the mixture of about 130° F. (54° C.).

"High shear" as used herein means the shear forces applied to ingredients being mixed to produce oxychloride or osysulfate cements equivalent to the shear forces applied to such ingredients by a propeller mixer such as a Waring blender or an Osterizer blender operating at a speed of 10,000 rpm or greater.

"Low shear" as used herein means the shear forces applied to ingredients being mixed to produce oxychloride or oxysulfate cements equivalent to the shear forces applied to such ingredients by a propeller mixer such as a Waring blender or Osterizer blender operating at a speed of less than 10,000 rpm.

As will be readily appreciated from the above example, the instant invention produces a molded magnesium oxychloride of enhanced properties in that a serious effloresence problem is eliminated by practicing the invention.

While the invention has been described with reference to certain specific embodiments, it is not intended to be limited thereby except insofar as appears in the accompanying claims.

I claim:

1. In a method of preparing magnesium oxychloride or magnesium oxysulfate cements in which magnesium oxide is mixed with magnesium chloride solutions or magnesium sulfate solutions in proportions sufficient to produce magnesium oxychloride or magnesium oxysulfate cements employing high shear blending techniques, the improvement comprising mixing at least about 75 percent by weight of the requisite magnesium oxide to be used with up to 90 percent of the magnesium chloride solution or magnesium sulfate solution required under low shear mixing conditions thus keeping the temperature of the mixture below 180° F. without external cooling until mixing is impeded by the viscosity of the mixture, adding the remaining magnesium oxide to the mixture and blending it therewith under high shear until a homogeneous mixture is obtained, subsequently adding the remaining magnesium chloride solution or magnesium sulfate solution to the homogeneous mixture so obtained and blending the mixture so formed under high shear mixing conditions to obtain a homogeneous magnesium oxychloride or magnesium oxysulfate cement.

2. In a method of preparing magnesium oxychloride or magnesium oxysulfate cements in which magnesium oxide is mixed with magnesium chloride solutions or magnesium sulfate solutions in proportions sufficient to produce magnesium oxychloride or magnesium oxysulfate cements employing high shear blending techniques, the improvement comprising mixing 75 percent or more of the requisite magnesium oxide with at least 80 percent of the required magnesium chloride or sulfate solutions under low shear mixing thus keeping the temperature of the mixture below 130° F. without external cooling to produce a first mixture, adding the remaining requisite magnesium oxide to the first mixture when the viscosity of said first mixture impedes the mixing while increasing the mixing speed to provide high shear blending of the ingredients, continuing the mixing until the mixture is homogeneous in appearance, adding the remaining magnesium chloride or sulfate solution to the homogeneous mixture and mixing under high shear until the mixture is again homogeneous in appearance.

3. In a method of preparing a magnesium oxychloride cement wherein magnesium oxide is mixed with magnesium chloride solutions in proportions sufficient to produce a magnesium oxychloride cement using high shear blending techniques, the improvement comprising mixing at least about 75 percent of the required magnesium oxide with between 80 to about 90 percent of the required magnesium chloride necessary to produce the magnesium oxychloride under low shear mixing thus keeping the temperature of the mixture below 130° F. without external cooling until the viscosity of the mixture begins to impede mixing, increasing the mixing speed to provide high shear mixing and adding the remaining required magnesium oxide to produce a first homogeneous mixture, adding the remaining magnesium chloride solution to said first homogeneous mixture and blending the magnesium chloride solution and first homogeneous mixture to produce a second homogeneous mixture of magnesium oxychloride cement.

4. In a method of preparing a magnesium oxysulfate cement wherein magnesium oxide is mixed with magnesium sulfate solution in proportions sufficient to produce a magnesium oxysulfate cement using high shear blending techniques, the improvement comprising mixing at least about 75 percent of the required magnesium oxide with between 80 to about 90 percent of the required magnesium sulfate necessary to produce the magnesium oxysulfate under low shear mixing thus keeping the temperature of the mixture below 130° F. without external cooling until the viscosity of the mixture begins to impede mixing, increasing the mixing speed to provide high shear mixing and adding the remaining required magnesium oxide to produce a first homogeneous mixture, adding the remaining magnesium sulfate solution to said first homogeneous mixture and blending the magnesium sulfate solution and first homogeneous mixture to produce a second homogeneous mixture of oxysulfate cement.

5. In a method of preparing a magnesium oxychloride cement wherein magnesium oxide is mixed with a magnesium chloride solution in proportions sufficient to produce a magnesium oxychloride cement using high shear blending techniques, the improvement comprising mixing at least about 75 percent of the required magnesium oxide with between 80 to about 90 percent of the required magnesium chloride necessary to produce the magnesium oxychloride from a magnesium chloride solution containing sodium hexametaphosphate and phosphoric acid under low shear mixing thus keeping the temperature of the mixture below 130° F. without external cooling until the viscosity of the mixture begins to impede mixing, increasing the mixing speed to provide high shear mixing and adding the remaining required magnesium oxide to produce a first homogeneous mixture, adding the remaining required magnesium chloride solution to said first homogeneous mixture and blending the magnesium chloride solution and first homogeneous mixture to produce a second homogeneous mixture of magnesium oxychloride cement.

6. In a method of preparing a magnesium oxysulfate cement wherein magnesium oxide is mixed with a magnesium sulfate solution in proportions sufficient to produce a magnesium sulfate cement using high shear blending techniques, the improvement comprising mixing at least about 75 percent of the required magnesium oxide with between 80 to about 90 percent of the required magnesium sulfate necessary to produce the magnesium oxysulfate from a magnesium sulfate solution containing sodium hexametaphosphate and phosphoric acid under low shear mixing thus keeping the temperature of the mixture below 130° F. without external cooling until the viscosity of the mixture begins to impede mixing, increasing the mixing speed to provide high shear mixing and adding the remaining required magnesium oxide to produce a first homogeneous mixture, adding the remaining magnesium sulfate solution to said first homogeneous mixture and blending the magnesium sulfate solution and first homogeneous mixture to produce a second homogeneous mixture of magnesium oxysulfate cement.

* * * * *

UNITED STATES PATENT AND TRADEMARK OFFICE
CERTIFICATE OF CORRECTION

PATENT NO. : 4,158,570
DATED : June 19, 1970
INVENTOR(S) : Robert G. Irwin

It is certified that error appears in the above-identified patent and that said Letters Patent are hereby corrected as shown below:

Column 5, line 51, Claim 1, "180°F." should be --130°F--.

Signed and Sealed this

Twenty-fifth Day of September 1979

[SEAL]

Attest:

LUTRELLE F. PARKER

*Attesting Officer*          *Acting Commissioner of Patents and Trademarks*